United States Patent
Bishop et al.

(10) Patent No.: US 9,730,253 B2
(45) Date of Patent: Aug. 8, 2017

(54) ENABLING UE ACCESS DOMAIN SELECTION FOR TERMINATED SPEECH/VIDEO CALLS

(71) Applicant: Samsung Electronics Co., Ltd., Gyeonggi-do (KR)

(72) Inventors: Craig Bishop, Middlesex (GB); Chen-Ho Chin, Middlesex (GB)

(73) Assignee: Samsung Electronics Co., Ltd (KR)

( * ) Notice: Subject to any disclaimer, the term of this patent is extended or adjusted under 35 U.S.C. 154(b) by 65 days.

(21) Appl. No.: 14/679,643

(22) Filed: Apr. 6, 2015

(65) Prior Publication Data

US 2015/0215975 A1    Jul. 30, 2015

Related U.S. Application Data

(63) Continuation of application No. 13/909,742, filed on Jun. 4, 2013, now Pat. No. 9,001,177, which is a (Continued)

(30) Foreign Application Priority Data

Jun. 26, 2007  (GB) .................................. 0712386.2
Aug. 21, 2007  (GB) .................................. 0716311.6

(51) Int. Cl.
*H04W 76/02*   (2009.01)
*H04W 48/16*   (2009.01)
(Continued)

(52) U.S. Cl.
CPC ......... *H04W 76/02* (2013.01); *H04L 65/1016* (2013.01); *H04L 65/1069* (2013.01);
(Continued)

(58) Field of Classification Search
CPC .. H04L 65/1016; H04L 65/1069; H04L 65/80; H04W 48/18; H04W 48/16; H04W 76/02; H04N 7/147
See application file for complete search history.

(56) References Cited

U.S. PATENT DOCUMENTS 6,567,667 B1    5/2003  Gupta et al.
7,325,058 B1 *  1/2008  Sheth .................. H04L 12/4633
                                                   709/223
(Continued)

FOREIGN PATENT DOCUMENTS

CN    1377559    10/2002
CN    1890931    1/2007
(Continued)

OTHER PUBLICATIONS

Chinese Office Action dated Aug. 5, 2015 issued in counterpart application No. 201310155921.0, 13 pages.
(Continued)

*Primary Examiner* — Brian D Nguyen
(74) *Attorney, Agent, or Firm* — The Farrell Law Firm, P.C.

(57) ABSTRACT

Methods, apparatuses, and systems are described for selecting an access domain for receiving a speech and/or video call at a mobile station of a mobile communications network in which calls are routed via a central service control common to a plurality of access domains. In one method, a terminating mobile station receives an INVITE and then, if the access network supports neither simultaneous circuit switched (CS) and packet switched (PS) connections nor voice over internet protocol (VoIP), the terminating mobile station transmits a message indicating that a CS bearer is required for a session.

12 Claims, 7 Drawing Sheets

Related U.S. Application Data continuation of application No. 12/666,727, filed as application No. PCT/KR2008/003706 on Jun. 26, 2008, now Pat. No. 8,467,379.

(51) Int. Cl.
*H04L 29/06* (2006.01)
*H04N 7/14* (2006.01)
*H04W 48/18* (2009.01)

(52) U.S. Cl.
CPC ............ *H04L 65/80* (2013.01); *H04N 7/147* (2013.01); *H04W 48/16* (2013.01); *H04W 48/18* (2013.01)

(56) References Cited

U.S. PATENT DOCUMENTS

| | | | |
|---|---|---|---|
| 7,359,373 | B2 | 4/2008 | Kuusinen et al. |
| 7,898,990 | B2 * | 3/2011 | Kallio .................. H04M 7/128 370/261 |
| 8,467,379 | B2 | 6/2013 | Bishop et al. |
| 9,055,517 | B2 * | 6/2015 | Purnadi ................ H04W 48/18 |
| 2005/0083909 | A1 | 4/2005 | Kuusinen et al. |
| 2005/0283832 | A1 * | 12/2005 | Pragada ............ H04L 29/06027 726/12 |
| 2006/0146766 | A1 | 7/2006 | Nakajima et al. |
| 2007/0053343 | A1 | 3/2007 | Suotula et al. |
| 2008/0022355 | A1 * | 1/2008 | Khosravi ............ H04L 61/2015 726/1 |
| 2008/0026752 | A1 | 1/2008 | Flore et al. |
| 2008/0080480 | A1 * | 4/2008 | Buckley .................. H04L 12/66 370/352 |
| 2008/0268824 | A1 * | 10/2008 | Allen ................ H04M 3/42059 455/415 |
| 2008/0309748 | A1 | 12/2008 | Franceschini et al. |
| 2009/0089435 | A1 | 4/2009 | Terrill et al. |
| 2009/0276532 | A1 | 11/2009 | Bishop |
| 2009/0296654 | A1 | 12/2009 | Bennett et al. |
| 2010/0195644 | A1 | 8/2010 | Hao |
| 2011/0090845 | A1 | 4/2011 | Bishop et al. |
| 2012/0281624 | A1 | 11/2012 | Rautiola et al. |
| 2013/0271555 | A1 | 10/2013 | Bishop et al. |

FOREIGN PATENT DOCUMENTS

| | | |
|---|---|---|
| EP | 1 531 645 | 5/2005 |
| EP | 1 232 611 | 9/2006 |
| JP | 2004-266581 | 9/2004 |
| KR | 1020040074796 | 8/2004 |
| WO | WO 2005/109796 | 11/2005 |
| WO | WO 2006/052176 | 5/2006 |
| WO | WO 2006/102943 | 10/2006 |
| WO | WO 2006/114120 | 11/2006 |

OTHER PUBLICATIONS (Release 8) 3GPP TR 23.892 V.1.0.0, Jun. 13, 2007.
Nortel: "VCC for ICS", 3GPP TSG SA WG2 Architecture SA2-57, S2-071858, Apr. 23, 2007.
Nokia Siemens Networks, Nokia, "UE Assisted ADS for Terminating Session", S2-072459, 3GPP TSG SA WG2 Architecture—S2#58, Jun. 25-29, 2007, 4 pages.
European Search Report dated Apr. 15, 2016 issued in counterpart application No. 08766642.6-1853, 7 pages.

* cited by examiner

ENABLING UE ACCESS DOMAIN SELECTION FOR TERMINATED SPEECH/VIDEO CALLS

PRIORITY

This application is a Continuation Application of U.S. application Ser. No. 13/909,742, filed in the U.S. Patent and Trademark Office on Jun. 4, 2013 and issuing on Apr. 7, 2015 as U.S. Pat. No. 9,001,177, which was a Continuation Application of U.S. application Ser. No. 12/666,727, filed in the U.S. Patent and Trademark Office on Nov. 16, 2010 and issuing as U.S. Pat. No. 8,467,379 on Jun. 18, 2013, which was the National Phase of PCT International App. No. PCT/KR2008/003706, filed on Jun. 26, 2008, which claimed priority to United Kingdom Patent App. Nos. 0712386.2, filed on Jun. 26, 2007, and 0716311.6, filed on Aug. 21, 2007, the contents of all of which are incorporated herein by reference.

BACKGROUND OF THE INVENTION

1. Field of the Invention

This invention relates to a mobile communication system in which speech/video calls may be provided to a mobile terminal via either the circuit-switched (CS) domain or via the packet-switched (PS) domain. The invention has particular, but not exclusive, relevance to a dual mode CS/IP Multimedia System (IMS) system.

2. Description of the Related Art

In a dual mode CS/IMS system, speech/video calls can be provided to mobile terminals via either the CS domain or via the IMS, e.g. as a Voice over IP (VoIP) call. In order to avoid having to maintain and update both the legacy CS and the emerging IMS Core Network, many companies are looking to centralise the control of speech/video related services in only the IMS Core Network. However, for example, not all IP Connectivity Access Networks (IP-CANs) can support the Quality of Service (QoS) required by VoIP services, so in order to allow access to centralised services where VoIP capable IP-CANs are not available, the $3^{rd}$ Generation Partnership Project (3GPP) is defining means by which terminals can use the CS domain to connect to and access services provided by the IMS. This is known as IMS Centralised Service control or "ICS".

One of the issues that arises in the case of dual mode terminals operating in dual mode networks, is that of domain selection for a speech call. In the case of a Mobile Originating (MO) call, it is relatively straightforward for the user equipment (UE) originating a call, e.g. a cellular phone or the like, to select in which domain to initiate the call if the UE knows the capability of the access network to support VoIP. Further, within the confines of the presently proposed ICS solutions, the UE can determine whether to use the Session Initiation Protocol (SIP) via a PS based signalling channel in parallel with CS bearer establishment or an IMS CS Control Protocol (ICCP) via USSD (or rely on CAMEL triggering) to be able to utilise ICS.

In ICS, the terminal is represented by a remote user agent (RUA) in the IMS so that the terminal appears to be connecting via an IP-CAN for speech/video services even if there is no IP-CAN present, or if the available IP-CAN cannot support speech/video.

The ICS solutions as presently defined considers two possible scenarios:

1. There is no IP-CAN available i.e. there is no PS domain coverage, or it is not possible to transmit and receive via PS in parallel with CS;
2. There is IP-CAN coverage available that can be used in parallel with CS, but the IP-CAN does not support speech or video (e.g. VoIP).

In the case of 1, the present ICS solutions propose that CS calls from the terminal can either:

a. be re-routed using CAMEL triggers to the IMS for centralised service provision; or b. be established directly towards the IMS CS Control Function (ICCF) in the network with associated SIP session parameters being sent to the ICCF via ICCP over USSD.

In the case of 2, the present ICS solutions propose that a standard SIP INVITE is sent towards the Called Party that is routed via the ICCF due to initial Filter Criteria (iFC) processing at the serving Call Session Control Function (S-CSCF). The terminal then establishes a CS bearer towards the ICCF using standard CS Call Control.

In both cases the ICCF correlates the CS bearer with the information received via USSD or in the SIP INVITE and establishes a session towards the Called Party via the IMS. The originating terminal can then use either SIP signalling, or USSD (depending on the capability of the access network) to control and configure services in IMS for that call.

As discussed above, the terminal makes the decision of how and via which access domain to establish an MO call. A challenge however, exists in the case of Mobile Terminating (MT) calls. The current solutions envisage that a Domain Selection Function in the ICCF (perhaps with the help of the terminating terminal) will determine via which access domain to route a telephone call for mobile termination. This requires that the ICCF is somehow able to know, and be updated with, the capability of the IP-CAN and local access network which the terminating terminal is currently in, in order to determine whether to use USSD or SIP via PS to contact the terminal. It is not entirely clear how the ICCF will be able to know this, but it has been suggested that the terminal could send information about the capability of the local access network to the ICCF to help it make that decision. It has already been proposed (e.g. see UK patent application 0601007.8 whose whole contents in hereby incorporated herein by reference) that the network provides an indication of its VoIP capability to the terminal to aid MO access domain selection. Contributions to SA2 (e.g. NSN paper S2-072459) have proposed that the terminal may signal the VoIP capability of its current access domain to the ICCF to help the network select the terminating domain.

FIG. 1 shows an example of the existing terminating call domain selection functionality for ICS. In this case, the IMS has to know about and be updated with—the VoIP and simultaneous CS/PS capability of the access network in order to determine via which domain to attempt termination of the call and how to signal the incoming call to the terminal. This would incur significantly extra signalling overhead between the network and the terminal as the information would have to be updated as the terminal moves within the network.

As shown in FIG. 1, following arrival, at S1, of a call notification, the ICCF checks, at S3, if the terminating terminal is IMS registered. If the terminating terminal is IMS registered, the ICCF checks, at S5, if the terminating terminal is currently in an access network which supports VoIP, and if so sends, at S7, an SIP INVITE to the terminating terminal via the PS domain indicating that a VoIP call is to be established. On receiving the SIP INVITE, the terminating terminal then responds, at S9, using a SIP 18x message and a normal IMS session ensues.

If the terminating terminal is IMS registered but is currently in an access network which does not support VoIP, the ICCF checks, at S11, if the terminating terminal is currently in an access network which supports simultaneous PS and CS communication. If so, the ICCF sends, at S13, an SIP INVITE to the terminating terminal via the PS domain indicating that a call is to be established utilising a CS bearer for media and a PS control channel. Following receipt of the SIP INVITE, the terminating terminal responds, at S15, using SIP via the PS domain and establishes a CS bearer towards the ICCF for transport of media. The IMS session then ensues, at S17, using CS bearer for media and SIP via PS domain for control and configuration of services.

If the terminating terminal is not IMS registered, or if the terminating terminal is IMS registered but is not able to receive PS and CS in parallel, then the ICCF checks, at S19, if the terminal is registered to receive IMS via the CS domain. If so, the ICCF sends, at S21, an incoming call notification to the terminating terminal via USSD. On receipt of the incoming call notification, the terminating terminal responds, at S23, using USSD via the CS domain and establishes a CS bearer towards the ICCF for transport of media. The IMS session then ensues, at S25, using CS bearer for media with ICCP via USSD for control and configuration of services.

If the terminal is not registered to receive IMS services, the ICCF checks, at S27, if the terminal is registered to receive normal CS. If so, the ICCF completes, at S29, the session as a standard CS call towards the terminal. If not, the ICCF determines, at S31, that the call cannot be completed.

As discussed above, the existing solution requires the ICCF in the IMS network to know about the capabilities of the serving IP-CAN to support real time conversational speech/video, e.g. via VoIP. It also requires the IMS to know about the capability of the local access network to support simultaneous CS and PS bearers. This requires additional signalling either between the UE and the IMS, or between the IP-CAN and the IMS.

SUMMARY OF THE INVENTION

According to an aspect of the invention, there is provided a method of selecting an access domain for receiving a speech and/or video call at a mobile station of a mobile communications network in which calls are routed via a central service control common to a plurality of access domains, the method comprising the mobile station deciding on an access domain for handling the call taking into account the capabilities of the local access network, and indicating the selected access domain to the central service control.

An aspect of the present invention allows the terminal to make the decision of in which domain to terminate the call based on the capability of the IP-CAN in the case where an IP-CAN is available, thereby reducing signalling and complexity in the system. This selection can be subject to communicated operator policy (for example via the Ut interface discussed in subclause 5.4.6 of 3GPP TS 23.206), so that ultimate control of the terminating domain still lies with the network operator. Another aspect of the invention enables the terminal to make the decision of whether a PS domain or USSD based control channel is required for associated signalling. In this way, the signalling required in the network to establish the capability of the local access network is reduced, and also the amount of USSD signalling could be reduced. One aspect of the present invention is, in essence, a more elegant solution for MT domain selection.

According to one aspect of the present invention, a method of processing a speech media by a terminating mobile station of a mobile communications network is provided, the method including receiving, by the terminating mobile station, an INVITE and, if an access network does not support simultaneous circuit switched (CS) and packet switched (PS) connection and does not support voice over internet protocol (VoIP), transmitting, by the terminating mobile station, a message indicating that a CS bearer is required for a session.

BRIEF DESCRIPTION OF THE DRAWINGS

Various exemplary embodiments of the invention will now be described with reference to the attached figures in which.

DETAILED DESCRIPTION OF EMBODIMENTS OF THE PRESENT INVENTION

In an embodiment of the invention, an ICS UE receives a normal Session Initiation Protocol (SIP) INVITE via the PS domain, but then has the option of responding via the CS domain to the ICCF using USSD to inform the ICCF that simultaneous PS and CS operation was not possible. This comes from the fact that an IMS registered UE can always receive a SIP INVITE regardless of whether it is connected via an access network that is capable of simultaneous CS and PS operation (provided that it is not already engaged in a CS call). A further inventive step is that the response from the terminal to the initial SIP INVITE contains an indication that a CS bearer shall be used for the media part of the session, if the IP-CAN is not able to support conversational speech/video, e.g. via VoIP. This information could be sent using a IMS Communication Service Identifier (ICSI), or some other means that will inform the ICCF to expect a subsequent CS bearer establishment to be associated with the session in case the fact that the SIP response to the SIP INVITE was delivered to the ICCF by USSD is not sufficiently indicative.

This invention builds on the ICS architecture described in 3GPP TR 23.892 that enables an IMS Core Network that can be accessed via an IP-CAN or to a more limited extent via the CS domain for the transport of user media and/or session establishment signalling. In particular, this invention enables the domain selection function in ICS networks to be placed in the UE for the purposes of call termination.

Figure 1:
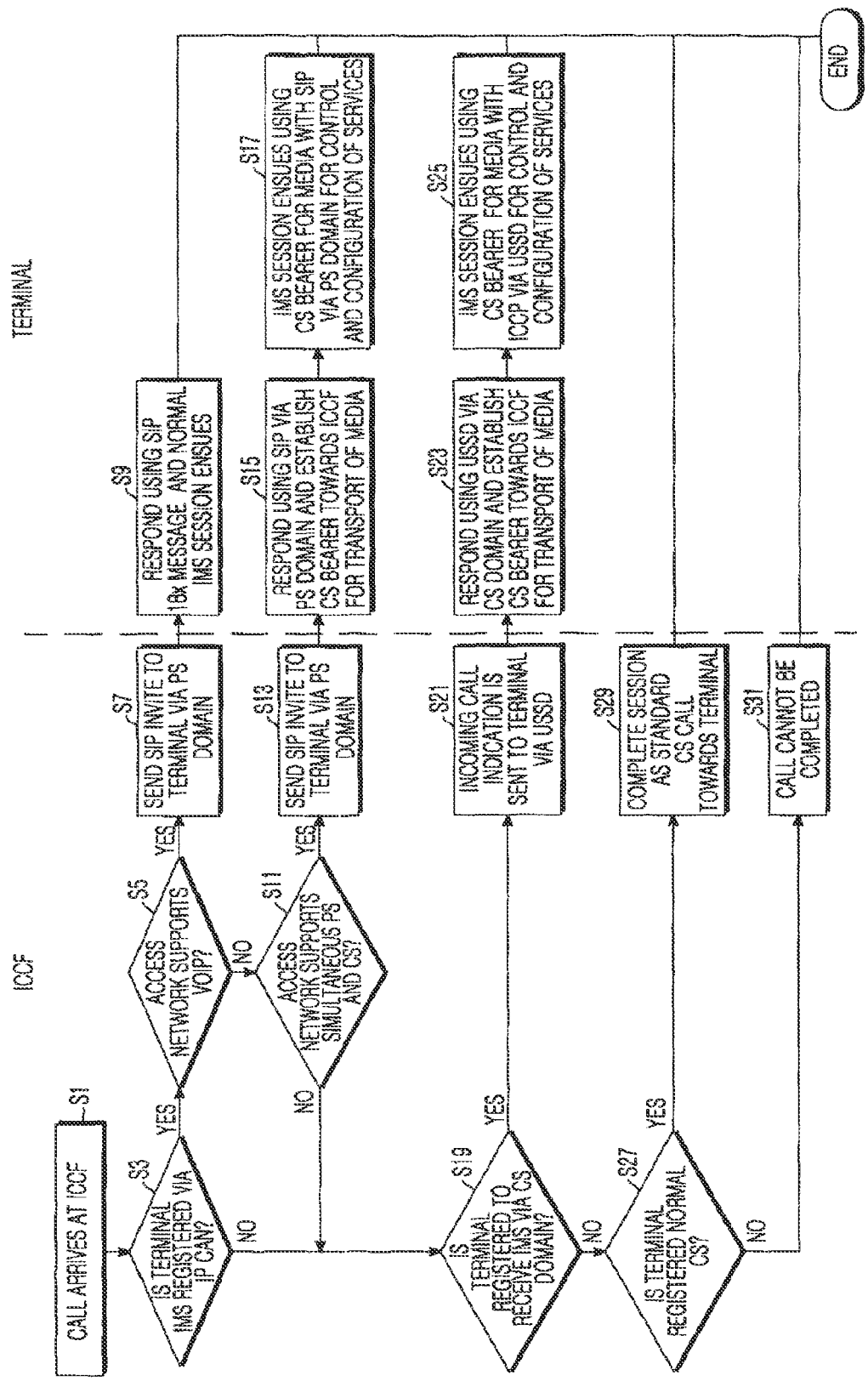
FIG. 1 is a flow chart showing an existing terminating call domain selection process for ICS.
Figure 2:
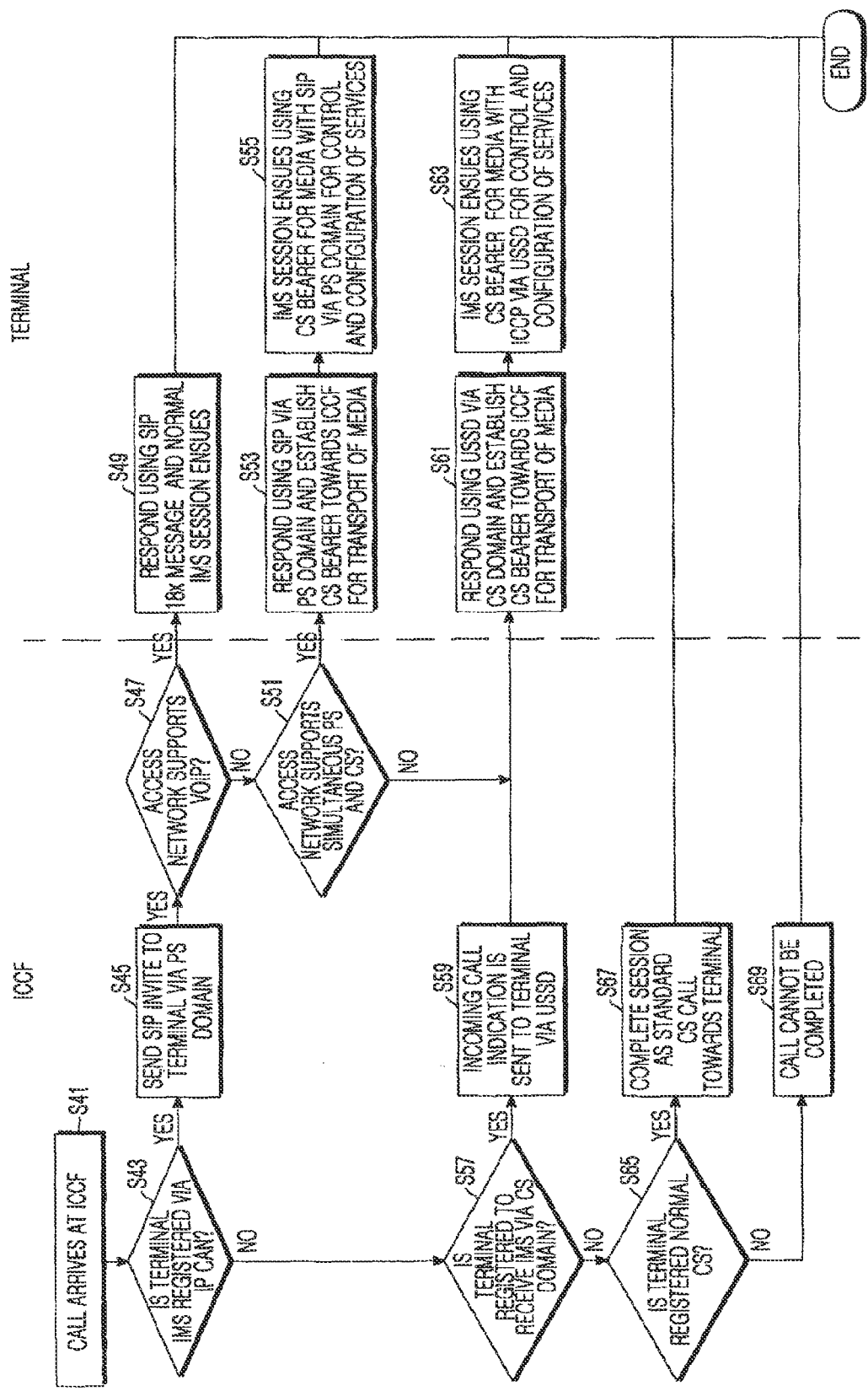
FIG. 2 is a flow chart showing a terminating call domain selection process for ICS according to an embodiment of the invention.

FIG. 2 presents an example logical flow in the case where the UE is allowed to determine the appropriate domain for session termination based on operator policy and the capabilities of the access network. In this case, the UE can also make the decision of whether a PS or USSD based control channel should be used for associated control signalling. According to an aspect of the invention, the ICCF is always included in the call flow for MT calls.

As shown in FIG. 2, after a call notification arrives, at S41, at the ICCF, the ICCF determines, at S43, if the terminating terminal is IMS registered via IP-CAN. If so, the ICCF sends, at S45, an SIP INVITE to the terminating terminal, regardless of the capability of the IP-CAN and the local access network to support real time speech/video e.g. via VoIP. On receiving the SIP INVITE, the terminating terminal determines, at S47, if the local access network supports VoIP. If VoIP is supported, the terminating terminal responds, at S49, using a SIP 18x message and a normal IMS session ensues.

If the terminating terminal determines, at S47, that the access network does not support VoIP, the terminating terminal checks, at S51, if the access network supports simultaneous communication in the CS and the PS domains. If so, the terminating terminal responds, at S53, with SIP 183 message (Session Progress) in the PS domain indicating that the media will be carried by a CS bearer, and establishes a CS bearer towards the ICCF for transport of media. The indication in the SIP 183 message that the media will be carried by a CS bearer can take a number of different forms: the SIP INVITE from the ICCF could convey an SDP offer containing a media line specifically indicating media transport via the CS domain, and the UE provides an SDP answer containing only the CS related media line; alternatively a SIP 415 message (unsupported media) could be sent, which could be interpreted by the ICCF, knowing that the ICS UE was registered via CS to receive IMS services, that a CS bearer should be established for the media transport. The IMS session then ensues, at S55, using the CS bearer for media with SIP via the PS domain for control and configuration of services.

If the terminating terminal determines, at S51, that the local access network is not able to support simultaneous CS and PS communication, then the terminating terminal responds, at S61, by sending a "progress" message using USSD via the CS domain indicating that the session should be established via the CS domain, and establishes a CS bearer towards the ICCF for transport of media. Alternatively, the UE could respond by sending a new SIP 4xx message towards the ICCF indicating that USSD should be used for CS bearer control. The IMS session then ensues, at S63, using the CS bearer for media with ICCP via USSD for control and configuration of services.

If the ICCF determines, at S43, that the terminating terminal is not IMS registered via IP-CAN, the ICCF determines, at S57, if the terminating terminal is registered to receive IMS via the CS domain. If so, the ICCF sends, at S59, an incoming call notification to the terminating terminal via USSD. Following receipt of the incoming call notification, the terminating terminal responds, at S61, using USSD via the CS domain and establishes a CS bearer towards the ICCF for transport of media. The IMS session then ensues, at S63, using the CS bearer for media with ICCP via USSD for control and configuration of services.

If the ICCF determines, at S57, that the terminating terminal is not registered to receive IMS via the CS domain, the ICCF checks, at S65, if the terminating terminal is registered to receive normal CS. If it is, the ICCF completes, at S67, the session as a standard CS call towards the terminating terminal. If it is not, the ICCF determines, at S69, that the call cannot be completed.

The present invention is applicable to the IP Multimedia System (IMS) centralised service (ICS) whose architecture requirements are discussed in 3GPP TR23.892 v1.0.0, which may be downloaded from www.3gpp.org and is hereby incorporated herein in its entirety by reference.

Figure 3:
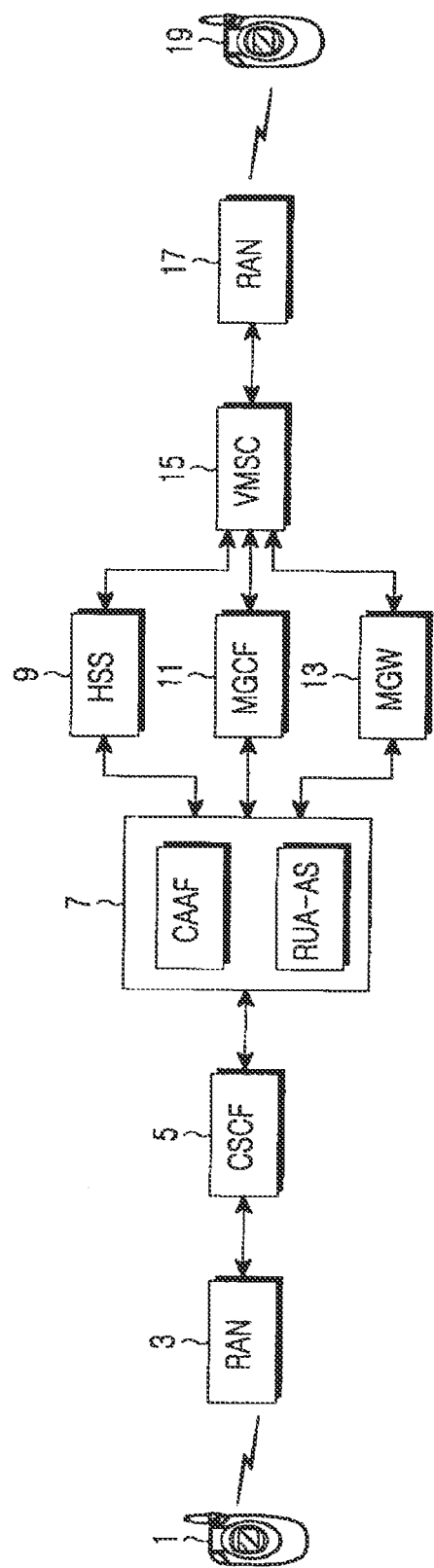
FIG. 3 schematically shows functional components of a system according to the present invention.

FIG. 3 schematically shows the main functional components of an ICS system relevant to the present invention. It will be appreciated that an ICS component includes many other functional components, but these have not been included in FIG. 3 for ease of illustration.

As shown in FIG. 3, an originating UE 1 communicates, via a local Radio Access Network (RAN) 3, with a call session control function (CSCF) 5. Those skilled in the art will appreciate that there are in fact three types of call session control functions, the proxy CSCF, the serving CSCF and the interrogating CSCF. However, for ease of explanation these have been grouped together in FIG. 3.

The CSCF 5 is connected to an IMS CS Control Function (ICCF) 7. The ICCF 7 provides functions necessary for provision of IMS services for calls originated or terminated over CS access networks and for calls transferred between CS and PS access networks. As shown in FIG. 3, the ICCF 7 includes two functions: the CS Access Adaptation Function (CAAF) and the Remote User Agent (RUA).

The ICCF 7 is connected to the Home Subscriber Server (HSS) 9, a Media Gateway Controller Function (MGCF) 11 and a Media Gateway 13. The HSS 9 is a mater user database containing subscription related information and can provide information about the location of a user. The MGW 13 interfaces with the media plane of the CS domain, and the MGCF 11 performs control protocol conversion.

The HSS 9, the MGCF 11 and the MOW 13 are all connected, via a visited mobile switching centre (VMSC) 15 and a radio access network 17, to the terminating UE 19.

When accessing IMS services via the CS domain, an IMS CS control channel (ICCC) is used to transport control signalling between the ICS UE and the IMS. The ICCC can be established over the CS domain network, in which case it is referred to as I1-cs, or over the PS domain, in which case it is referred to as I1-ps.

The USSD transport mechanism used in the CS domain, does not offer as much bandwidth as the PS bearer, and accordingly a suitable IMS CS Control Protocol (ICCP) is required.

Figure 4:
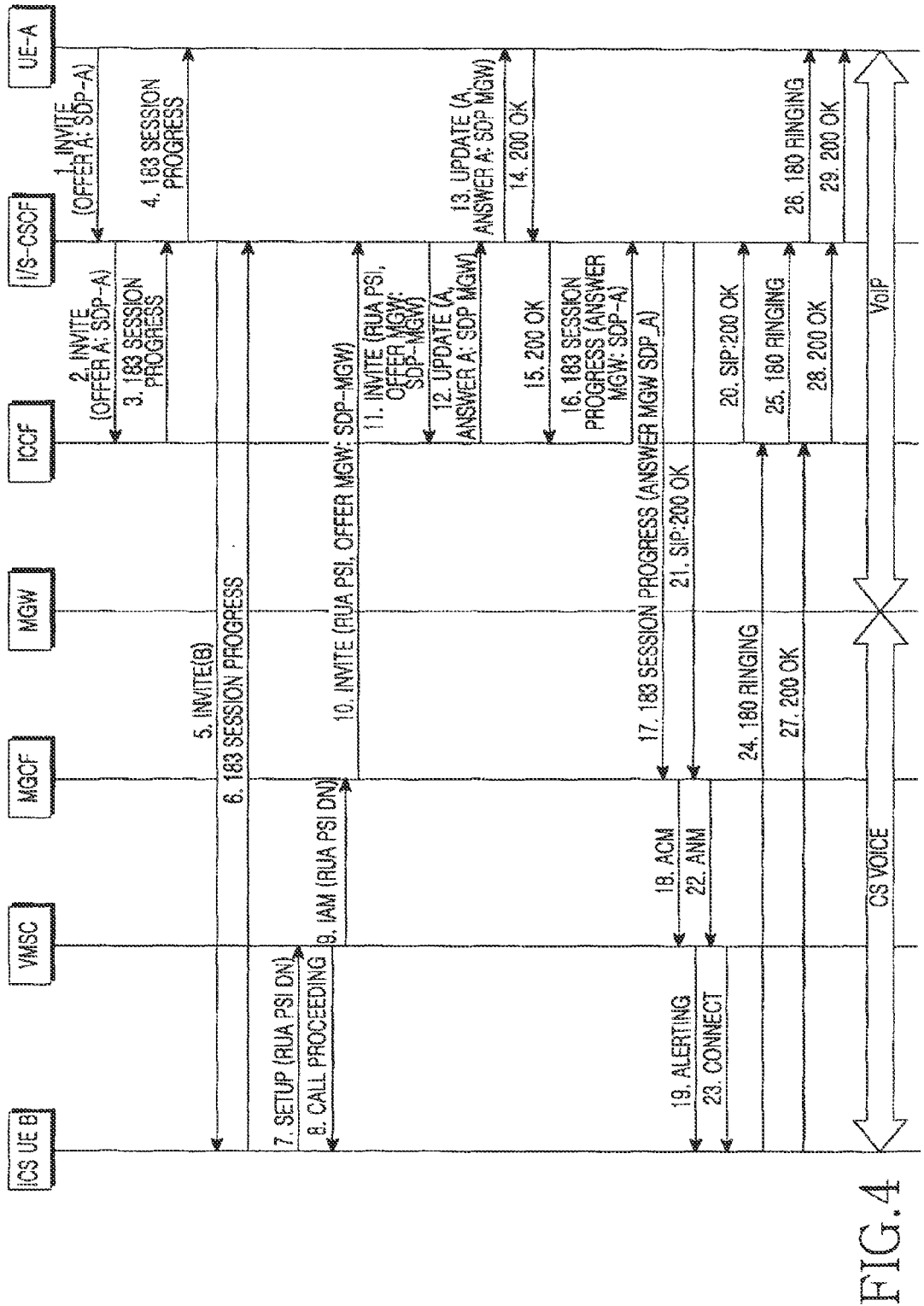
FIG. 4 illustrates the operations performed when a terminating terminal is IMS registered and the access network is capable of simultaneous CS and PS operation.

FIG. 4 shows an example message flow for call establishment when the terminal is IMS registered and the access network is capable of simultaneous CS and PS operation.

Whilst this message flow is not completely new what is different and illustrates the invention is in Step 6. In Step 6 upon receiving the SIP INVITE request, it is the UE who makes the decision on which domain the UE wants to complete the call. Furthermore, once that decision is taken by the UE, the UE conveys that indication back to the IMS Circuit Switched control function (ICCF) in Step 7.

1. An incoming SIP INVITE is received at the S-CSCF of the B party with an Offer containing SDP from the A-party.

2. The S-CSCF forwards the INVITE to the ICCF.

3. The ICCF sends a 183 Session Progress back to the S-CSCF.

4. The S-CSCF sends the 183 Session Progress to the A-party.

5. The ICCF (acting as a B2BUA) establishes a session over I1-ps by sending an INVITE to the B-party. The INVITE contains a dynamic RUA PSI to enable the ICCF to later on correlate the outgoing session control signalling with the incoming bearer control signalling.

6. UE-B responds with a 183 Session Progress, providing an indication to the ICCF that a CS bearer is required for the media transport, so that the ICCF will expect the subsequent INVITE from the UE that is associated with the CS bearer establishment.

7. UE-B sends a SETUP message to the VMSC to establish the Bearer Control Signalling session. The SETUP message includes the RUA PSI DN as the called party number. This will establish the circuit voice bearer between the UE and IMS.

8. The VMSC responds with a call proceeding message and begins to set up the Bearer Control Signalling session.

9. The VMSC processes the SETUP message and sends an IAM to the MGCF. The SETUP message contains the RUA PSI DN. [NOTE: Standard VMSC procedures for CS origination]

10. The MGCF performs a setup of the MOW and creates an INVITE with an Offer containing the SDP from the MGW. The INVITE is sent to the ICCF (via the I/S-CSCF). [NOTE: Standard MGCF procedure for PSTN origination]

11. The I/S-CSCF forwards the INVITE to RUA of ICCF.

12. The ICCF sends an UPDATE to the S-CSCF with an Answer to the Offer from the A-party, containing the SDP from the MGW.

13. The S-CSCF forwards the UPDATE to the A-party.

14. The S-CSCF receives a 200 OK to the UPDATE.

15. The S-CSCF forwards the 200 OK to the ICCF.

16. The ICCF sends a 183 Session Progress to S-CSCF with an Answer to the Offer from the MGW, containing the SDP from the A-party.

17. The S-CSCF sends the 183 Session Progress to the MGCF.

18. The MGCF creates an ACM and sends it to the VMSC.

19. Alerting is sent from the VMSC to UE B.

20. The ICCF sends a 200 OK to S-CSCF in response to the INVITE in Step 12.

21. The S-CSCF forwards the 200 OK to the MGCF.

22. The MGCF creates an ANM and sends it to the VMSC.

23. The VMSC sends a Connect to UE B. The set up of the bearer is complete.

24. User alerting at UE B; UE B sends 180 Ringing to the ICCF.

25. The ICCF forwards the 180 Ringing to the S-CSCF for communicating toward UE A.

26. The S-CSCF forwards the 180 Ringing to UE A.

27. User answer at UE B; UE B sends a 200 OK to the ICCF for the INVITE in Step 6.

28. The ICCF forwards the 200 OK to the S-CSCF for communicating toward UE.

29. The S-CSCF forwards the 200 OK towards to the A-party.

Figure 5:
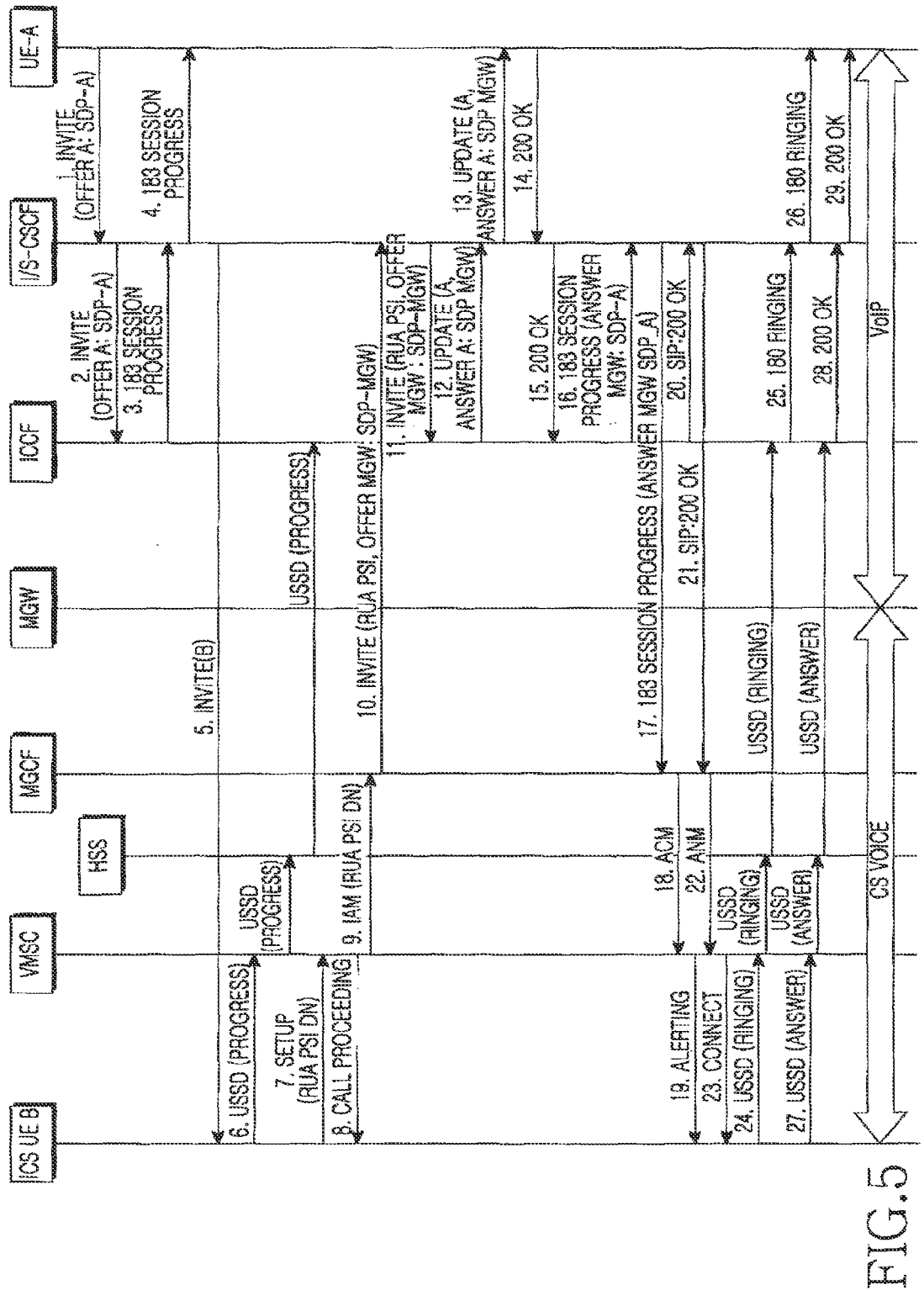
FIG. 5 illustrates the operations performed when a terminating terminal is IMS registered and the access network is not capable of simultaneous CS and PS operation.

FIG. 5 shows an example message flow call establishment when the terminal is IMS registered, but the access network is not capable of simultaneous CS and PS operation.

This message flow is new and shows that the ICS UE can respond to an incoming INVITE by sending a progress message via USSD to the ICCF. This informs the ICCF that further signalling for this session will be via USSD.

1. An incoming SIP INVITE is received at the S-CSCF of the B party with an Offer containing SDP from the A-party.

2. The S-CSCF forwards the INVITE to the ICCF.

3. The ICCF sends a 183 Session Progress back to the S-CSCF.

4. The S-CSCF sends the 183 Session Progress to the A-party.

5. The ICCF (acting as a B2BUA) establishes a session over I1-ps by sending an INVITE to the B-party. The INVITE contains a dynamic RUA PSI to enable the ICCF to later on correlate the outgoing session control signalling with the incoming bearer control signalling.

6. INVITE arrives at UE B. UE B determines that there is no simultaneous CS and PS capability in the access network. UE B sends Progress a USSD message to the VMSC. The VMSC forwards the USSD (Progress) to the HSS. The HSS forwards the USSD (Progress) to the CAAF of the ICCF. ICCF knows that USSD will be used for subsequent control signalling.

7. UE-B sends a SETUP message to the VMSC to establish the Bearer Control Signalling session. The SETUP message includes the RUA PSI DN as the called party number. This will establish the circuit voice bearer between the UE and IMS.

8. The VMSC responds with a call proceeding message and begins to set up the Bearer Control Signalling session.

9. The VMSC processes the SETUP message and sends an IAM to the MGCF. The SETUP message contains the RUA PSI DN. [NOTE: Standard VMSC procedures for CS origination]

10. The MGCF performs a setup of the MGW and creates an INVITE with an Offer containing the SDP from the MGW. The INVITE is sent to the ICCF (via the US-CSCF). [NOTE: Standard MGCF procedure for PSTN origination]

11. The I/S-CSCF forwards the INVITE to RUA of ICCF.

12. The ICCF sends an UPDATE to the S-CSCF with an Answer to the Offer from the A-party, containing the SDP from the MGW.

13. The S-CSCF forwards the UPDATE to the A-party.

14. The S-CSCF receives a 200 OK to the UPDATE.

15. The S-CSCF forwards the 200 OK to the ICCF.

16. The ICCF sends a 183 Session Progress to S-CSCF with an Answer to the Offer from the MGW, containing the SDP from the A-party.

17. The S-CSCF sends the 183 Session Progress to the MGCF.

18. The MGCF creates an ACM and sends it to the VMSC.

19. Alerting is sent from the VMSC to UE B.

20. The ICCF sends a 200 OK to S-CSCF in response to the INVITE in Step 12.

21. The S-CSCF forwards the 200 OK to the MGCF.

22. The MGCF creates an ANM and sends it to the VMSC.

23. The VMSC sends a Connect to UE B. The set up of the bearer is complete.

24. User Alerting at UE B; UE B sends Ringing in a USSD message to the VMSC. The VMSC forwards the USSD (Ringing) to the HSS. The HSS forwards the USSD (Ringing) to the CAAF of the ICCF.

25. The CAAF of the ICCF performs the necessary adaptation and relays the information needed for generation of the SIP message at the RUA of the ICCF. The RUA of the ICCF acting as a B2BUA creates a 180 Ringing and sends it to the S-CSCF for communicating with UE A.

26. The S-CSCF forwards the 180 Ringing to UE A.

27. User Answer at UE B; UE B sends Answer in a USSD message to the VMSC. The VMSC forwards the USSD (Answer) to the HSS. The HSS forwards the USSD (Answer) to the CAAF of the ICCF.

28. The CAAF of the ICCF performs the necessary adaptation and relays the information needed for generation of the SIP message at the RUA of the ICCF. The RUA of the ICCF acting as a B2BUA creates a 200 OK and sends it to the S-CSCF for communicating with UE A.

29. The S-CSCF forwards the 200 OK towards to the A-party.

Similarly Step 6 of FIG. 5 is new and different illustrating the invention. In Step 6 upon receiving the SIP INVITE request, it is the UE who makes the decision on which domain the UE wants to complete the call. Once that decision is taken by the UE, that decision is made known to the ICCF (in Step 7).

Figure 6:
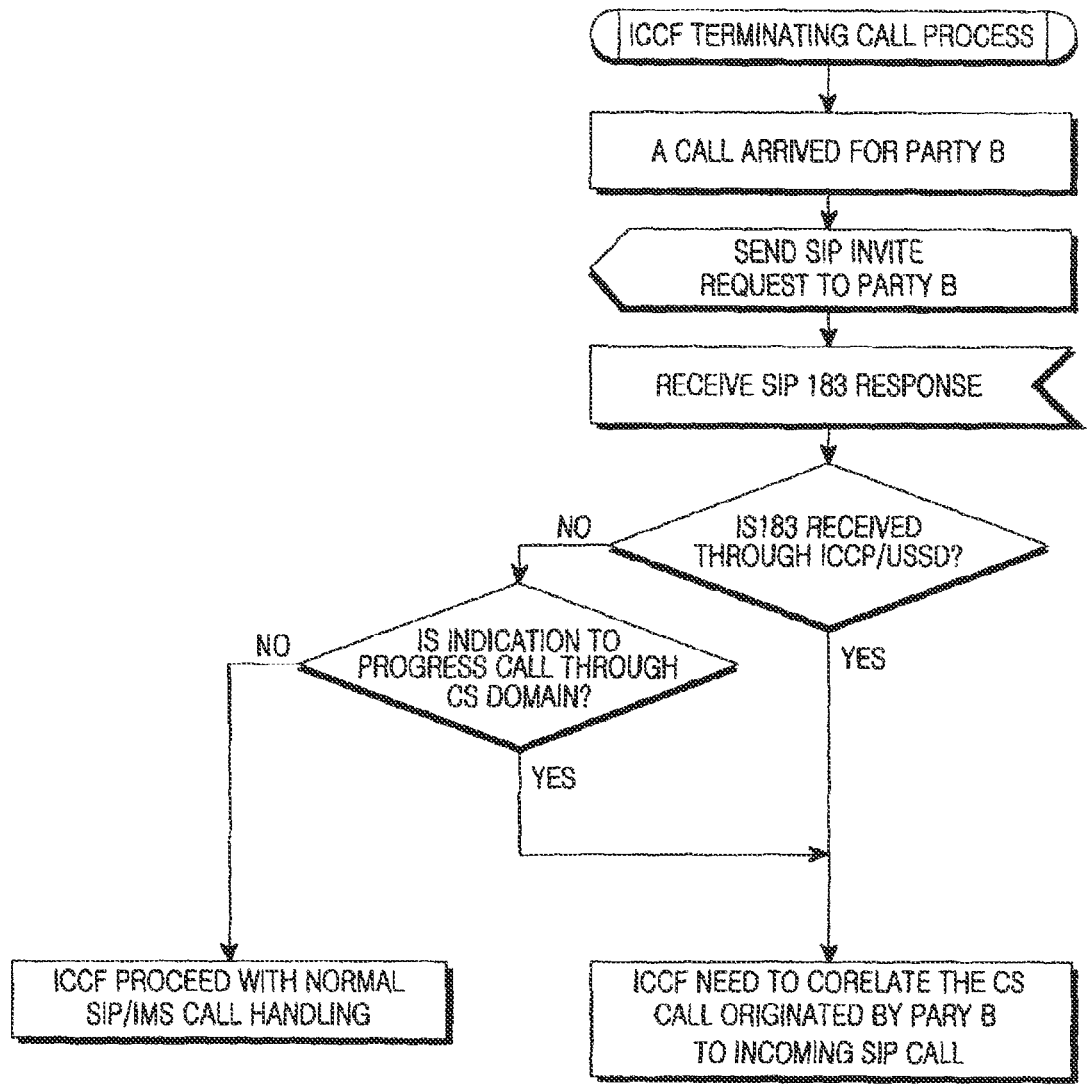
FIG. 6 is a flow chart showing operations performed by an ICCF to determine the need to correlate a CS call with an incoming SIP call.

For what is illustrated in both FIG. 4 and FIG. 5, the ICCF has to make a correlation of the CS call to the IMS call (from UE A) as the call between UE-A and UE-B is not completed through the IMS CN in the normal IMS way of call completion. So in Step 7 (of both FIG. 4 and FIG. 5) the UE response with 183 Session progress has to lead the ICCF has to conclude if correlation with the CS domain is required. FIG. 6, gives a diagrammatic illustration of the process leading the ICCF to determine the need for such correlation.

Modifications and Further Embodiments

It is not necessary for registration in the IMS to be required by a CS connected terminal unless an IP-CAN is available. As such, the concept that the ICCF knowing the UE was registered via CS to receive IMS services may be redundant. However, the use of an SDP offer/answer mechanism is still valid.

Figure 7:
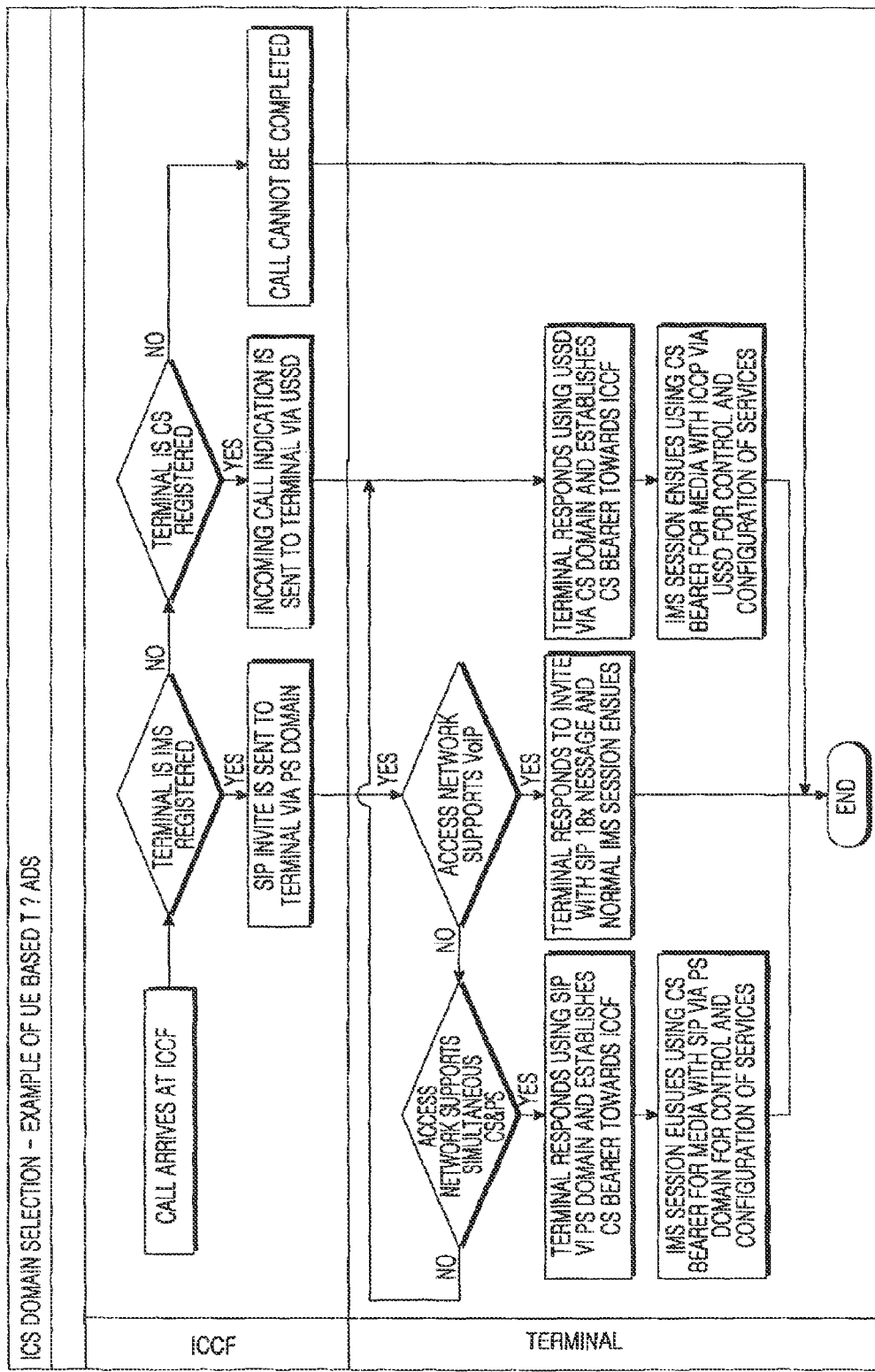
FIG. 7 is a flow chart showing a terminating call domain selection process for ICS according to an alternative embodiment of the invention.

FIG. 7 presents another exemplary logical flow in the case where the UE is allowed to determine the appropriate domain for session termination in conjunction with the ICCF based on operator policy and the capabilities of the access network. Note that this example assumes the UE to be ICS capable. The ICS information such as operator policy and RUA PSI DN is communicated to the ICS UE in a manner similar to that used for terminal provisioning in VCC. Domain selection based on operator policy would enable the home network to remain in control of the domain selection decision. In this case, the UE can also make the decision of whether a PS or USSD based control channel should be used for associated control signalling. A solution such as this would remove the need to pass information between the visited access network and the home IMS, and could also reduce the amount of signalling sent via USSD. Further it makes for a more elegant solution for MT domain selection in the case of an ICS home network maintaining the access network independence of the IMS, and would be gracefully forward compatible as an increasing number of IP-CAN s become VoIP capable. It could also help to overcome issues relating to domain selection in the case of signalling free mobility between the EPS and legacy access networks.

The example termination process is as follows:

1. The ICCF will always be included in the call flow for MT calls.

2. If the terminal is IMS registered the ICCF sends an INVITE to the terminating UE (regardless of the capability of the IP-CAN to support real time speech/video e.g. via VoIP which is not known).

a. If the terminal determines it is in a VoIP capable IP-CAN it will respond to the INVITE with a standard 18x response and the session will be established via IMS.

b. If the terminal determines it is in a IP-CAN where VoIP cannot be supported, but where the access network can support simultaneous PS and CS, it will respond with a 183 response, that indicates that the media should be carried via a CS bearer. The UE will then establish a CS bearer towards the ICCF, and the ICCF will correlate the CS bearer with the IMS session (INVITE/183 Progress). The session will be treated as an IMS session using a CS bearer for transport of the media.

c. If the terminal determines it is in a IP-CAN where VoIP cannot be supported and where there is no simultaneous CS and PS in the access network, it could respond by sending a "progress" message via USSD towards the ICCF by way of indicating that the session should be established via the CS domain using I1-cs procedures. The ICCF will correlate with the IMS signalling (INVITE) for the session. Further control and configuration of services will be via USSD.

3. If the terminal is not IMS registered via an IP-CAN but is CS registered, the ICCF will use USSD to send the incoming call notification towards the terminal. The UE will establish a CS bearer towards the ICCF using I1-cs call establishment procedures that the ICCF will correlate with the IMS signalling (INVITE) for the session. Further control and configuration of services will be via USSD.

What is claimed is:

1. A method for determining an access domain by a terminating mobile station of a mobile communications network, comprising:
receiving an INVITE;
determining an access domain based at least on capabilities of an access network and on the INVITE; and
establishing a call based on the determined access domain,
wherein determining the access domain comprises:
if a bidirectional speech media and a voice over internet protocol (VoIP) are not supported by the access network, transmitting a message indicating that a circuit switched (CS) bearer is required for a session.

2. The method of claim 1, wherein the access domain is determined based also on policies of an operator.

3. The method of claim 1, wherein the message is a session progress message.

4. An apparatus for determining an access domain by a terminating mobile station in a mobile communications network, comprising:
a transceiver configured to transmit or receive data; and
a controller configured to:
receive an INVITE,
determine an access domain based at least on capabilities of an access network and on the INVITE, and
establish a call based on the determined access domain,
wherein determining the access domain comprises:
if a bidirectional speech media and a voice over internet protocol (VoIP) are not supported by the access network, transmitting a message indicating that a circuit switched (CS) bearer is required for a session.

5. The apparatus of claim 4, wherein the access domain is determined based also on policies of an operator.

6. The apparatus of claim 4, wherein the message is a session progress message.

7. A method for processing an access domain of a terminating mobile station by an access network in a mobile communications network, comprising:
transmitting, to the terminating mobile station, an INVITE; and
receiving, from the terminating mobile station, a message indicating that a circuit switched (CS) bearer is required for a session if a bidirectional speech media and a voice over internet protocol (VoIP) are not supported by the access network, wherein the access domain is determined based at least on capabilities of the access network and on the INVITE.

8. The method of claim 7, wherein the access domain is determined also based on policies of an operator.

9. The method of claim 7, wherein the message is a session progress message.

10. An apparatus for processing an access domain of a terminating mobile station by an access network in a mobile communications network, comprising:

a transceiver configured to transmit or receive data; and
a controller configured to:
   transmit, to the terminating mobile station, an INVITE; and
   receive, from the terminating mobile station, a message indicating that a circuit switched (CS) bearer is required for a session if a bidirectional speech media and a voice over internet protocol (VoIP) are not supported by the access network,
wherein the access domain is determined based at least on capabilities of the access network and on the INVITE.

11. The apparatus of claim 10, wherein the access domain is determined also based on policies of an operator.

12. The apparatus of claim 10, wherein the message is a session progress message.

* * * * *